(12) United States Patent
Santilli

(10) Patent No.: US 6,972,118 B2
(45) Date of Patent: Dec. 6, 2005

(54) APPARATUS AND METHOD FOR PROCESSING HYDROGEN, OXYGEN AND OTHER GASES

(75) Inventor: Ruggero Maria Santilli, Palm Harbor, FL (US)

(73) Assignee: Hadronic Press, Inc., Palm Harbor, FL (US)

( * ) Notice: Subject to any disclaimer, the term of this patent is extended or adjusted under 35 U.S.C. 154(b) by 334 days.

(21) Appl. No.: 10/020,091

(22) Filed: Dec. 14, 2001

(65) Prior Publication Data
US 2003/0113597 A1     Jun. 19, 2003

(51) Int. Cl.[7] .................................. B01J 19/08
(52) U.S. Cl. .................... 422/186.21; 422/186.25; 204/164
(58) Field of Search .................... 422/186.21, 186.25; 204/164

(56) References Cited

U.S. PATENT DOCUMENTS

| 5,227,038 A | * | 7/1993 | Smalley et al. | ............. 204/173 |
| 6,540,966 B1 | * | 4/2003 | Santilli | .................. 422/186.21 |

* cited by examiner

Primary Examiner—Kishor Mayekar
(74) Attorney, Agent, or Firm—Dennis G. LaPointe

(57) ABSTRACT

Apparatus and method for the industrial production of a new form of hydrogen, oxygen and other gases. The invention includes a pressure resistant piping system filled with a gas compressed to a desired pressure. A magnetic field within the piping system is generated using electric power. The gas is circulated through the electric arc causing the magnetic field.

18 Claims, 16 Drawing Sheets

| Component | Gas |
|---|---|
| Hydrogen | 99.2 |
| Carbon monoxide | None detected |
| Carbon dioxide | None detected |
| Methane | 0.78 |
| Ethane | None detected |
| Ethene (ethylene) | None detected |
| Ethyne (acetylene) | None detected |

Fig. 15

APPARATUS AND METHOD FOR PROCESSING HYDROGEN, OXYGEN AND OTHER GASES

BACKGROUND OF THE INVENTION

Hydrogen is emerging as one of the primary alternative fuels for the large scale replacement of gasoline and other fossil fuels via its use as automotive fuel or in fuel cells. However, hydrogen is a fuel with one of the lowest molecular weights and energy content among all available fuels. In fact, the hydrogen molecule has a molecular weight of about two atomic mass unit (2 a.m.u.) and the energy content in British Thermal Units (BTU) per standard cubic foot (scf) of about 300 BTU/scf. By comparison, gaseous hydrocarbons can have average molecular weights and energy content up to eight times these values, as in the case of acetylene.

These low values of weights and energy content have caused serious technological, logistic and financial problems which have prevented hydrogen from replacing fossil fuels on a large scale until now, such as:

1) The low average molecular weight implying in a low specific density prevents the automotive use of hydrogen in a compressed form because of insufficient range, or excessively large storage requirements. For instance, gasoline contains about 115,000 BTU per American gallon (g). As a result, the gasoline gallon equivalent of hydrogen is given by 115,000 BTU/300 BTU=383 scf. Therefore, the equivalent of a 20 g gasoline tank would require 7,666 standard cubic feet (scf) of hydrogen which is a prohibitive number of scf for storage in an ordinary car.

2) As proved by the automobiles built by the American auto maker GM, the German auto makers BMW and other car manufacturers, the achievement of a sufficient range for ordinary automotive use requires the liquefaction of hydrogen. By recalling that hydrogen liquefied at a temperature close to the absolute zero degree, it is evident that the liquefaction of hydrogen , its transportation in a liquefied form and the maintainment of such a liquid state in a car implies dramatic expenditures. It then follows that the current automotive use of hydrogen is much more expensive than gasoline.

3) The automotive use of liquid hydrogen is dangerous because of the possible transition of state from liquid to gas in the event of termination of electricity for cryogenic equipment or other malfunctions.

The use of hydrogen in fuel cells is also afflicted by the same problems which are inherent in the low specific density and energy output of conventional hydrogen.

This invention resolves the above problems for the use of hydrogen as a fuel by achieving a new form of hydrogen, called for reasons explained below MagH™ hydrogen fuel which possesses an average molecular weight and energy output bigger than those of conventional hydrogen.

This invention also implies the production of a new form of oxygen, called MagO™ oxygen which also possesses an average molecular weight and energy content much bigger than those of the conventional oxygen.

This invention also implies the production of a new form of oxygen, called MagO™ oxygen which also possesses specific density and energy content much bigger than those of the conventional oxygen.

Therefore, the combustion of MagH™ hydrogen fuel with MagO™ oxygen, whether for automotive use or for a fuel cell, implies a further dramatic reduction of storage tanks, an increase of the energy output, and a consequential reduction of costs.

A scientific notion of paramount importance for this invention is the new chemical species of magnecular clusters discovered by this inventor.

These magnecular clusters are stable clusters generally composed of individual atoms, parts of conventional molecules called dimers (or also radicals) and ordinary molecules under a new internal bond originating in the electric and magnetic polarizations of the orbits of at least some peripheral atomic electrons. There is a dominance of magnetic over electric polarizations.

These magnecular clusters are generally detected via macroscopic peaks in Gas Chromatographic Mass Spectrometric (GC-MS) equipment, which peaks result to be unknown following computer search among all known molecules, while having no signature under InfraRed Detectors (IRD) at the atomic weight of the MS peak. The latter occurrence establishes that the peak detected in the GC-MS cannot possibly be a molecules, particular for the case of large cluster with a weight of the order of hundreds of a.m.u. After eliminating valence bonds, the only remaining possibility for explaining the internal attractive force holding the magnecular clusters together is that such forces are of magnetic and electric nature.

Additional experimental evidence has establish that the attractive bond responsible for the existence of the magnecular clusters originates from the property well established in contemporary science, according to which, when an atom is exposed to a sufficiently strong external magnetic field, the orbitals of its peripheral electrons cannot any longer be distributed in all space directions, and must acquire a toroidal distribution, with consequential creation of a new magnetic dipole moment North-South caused by the rotation of the electron charges in said toroid, which dipole is evidently aligned along the symmetry axes of said toroidal distribution in such a way to have magnetic polarities opposite to the external ones, as illustrated in FIG. 1.

Atoms, dimers or molecules with toroidal polarization of the orbitals then bond to each other in chains of opposing polarities North-South-North-South- . . . , resulting in the indicated formation of magnecules schematically illustrated in FIG. 2.

Note that such a toroidal polarization of the orbitals of peripheral atomic electrons creates a magnetic field which is not generally detectable in the conventional space distribution of said orbitals. Simple calculations show that such a field is quite strong since it is generally of the order of 1,415 times the value of the intrinsic magnetic field of the nuclei. As a result, the toroidal polarization of the orbitals of peripheral; atomic electrons creates indeed a new field sufficiently strong to originate a new chemical species.

It should also be noted that the magnetic polarization of an atom also implies the polarization of the intrinsic magnetic moments of electrons and of nuclei. As a result, the magnetic bond between polarized atoms can be composed by three separate attractive forces among opposite polarities originating from the magnetic moments of orbitals, electrons and nuclei, as also illustrated in FIGS. 1 and 2.

Said magnetic polarizations are individually unstable, because the conventional distribution of the orbitals in all directions in space is reacquired due to rotations caused by temperature as soon as the external magnetic field is terminated. However, the coupling via opposing magnetic polarities of two or more atoms is instead stable because, when the external magnetic field is removed, rotations due to temperature apply to the bonded atoms as a whole and not to the individual atoms. As a result, the clusters are stable at ordinary atmospheric temperatures and pressures.

The above joint stability for coupled magnetic polarization does occur for individual or coupled electric polarizations, as well known. In fact, electric polarizations are essentially reducible to ellipsoidical deformations of orbitals with consequential predominance of one change at one end and the opposite charge at the other end. Whether individual or coupled, such ellipsoidical deformations are evidently terminated by collisions, rotations and other effects due to temperature, and this explains the dominance of magnetic over electric polarizations.

Recall that all magnetic effects are known to cease at a temperature called the Curie Temperature. This is also the case for magnecules which decompose at a certain temperature varying from substance to substance, which temperature is generally of the order of the combustion temperature.

An important feature of the magnecular cluster is that said magnetic polarization occurs in individual atoms rather than in molecules as a whole. This implies that this new chemical species can be formed for all possible gases irrespective of whether they are paramagnetic or diamagnetic.

In fact, the hydrogen molecule $H_2$ is known to be diamagnetic, namely, clear experimental evidence has established that, when exposed to a magnetic field as strong as desired, the hydrogen molecule does not acquire a total net magnetic polarization North-South. However, by no means this property prevents magnetic polarizations of each individual atom H of the $H_2$ molecules, which polarizations can then individually bond atom to atom, rather than molecule to molecule, and form in this way the magnecular clusters.

Extensive studies have established that, when subjected to an external magnetic field at absolute zero degree temperature, the hydrogen molecule performs the transition from a spherical distribution of radius equal to the H diameter to a plane distribution in which the rotations of the bonded valence pair in the two atoms are opposite to each other, as illustrated in FIG. 3. This implies that a fully polarized $H_2$ molecule is composed by two fully polarized H atom with opposite directions of the polarizations. Due to the very small distances of their symmetry axes, which is of the order of 10-8 cm, opposite adjacent polarizations cancel each other, resulting in said diamagnetic character of the $H_2$ molecule. The point however persists that each individual polarized H atom of an $H_2$ molecule can indeed bond to another polarized H atom, as illustrated in FIG. 2.

The above problem does not exist for the oxygen molecules $O_2$ which is known to be paramagnetic, thus capable of acquiring a total net magnetic polarity. However, the magnetic field used in this invention exist at the specific level of each individual atoms. Therefore, whether for the hydrogen or the oxygen molecules, a central objective remains that of achieving a magnetic polarization of the individual atoms irrespective of whether the complete molecule is paramagnetic or not.

It is evident that the new chemical species of magnecular clusters implies an increase of the specific weight of any gas, thus including hydrogen and oxygen. In fact, by denoting the valence bond with the symbol—and the magnetic bond with the symbol x, it is evident that the creation of an essentially pure population of magnecular clusters with the structures (H—H)xH, (H—H)x(H—H), (H—H)x(H—H)xH, etc., have respective molecular weights of the order of 3, 4, 5, etc., while the conventional molecular structure $H_2$ can only have a molecular weight close to 2, as recalled earlier.

It is then evident that the increase of the average molecular weight of the gas, say, of the order of 5 implies a reduction of tank capacities by ⅕ because each cluster in a gas, whether under a valence or magnetic bond, acts as a single entity for pressure, temperature, etc. It then follows that the required 7,666 scf of $H_2$ for the equivalent of 20 gasoline gallons are reduced in the preceding example to about 1,500 scf which can be easily accommodated in an ordinary tank of about 3.5 scf in volume at about 4,000 pounds per square inch (psi).

It should be stressed that a 5 time increase of the molecular weight of the hydrogen directly implies that its energy content is increased 5 folds, from then original 300 BTU/scf to 1,500 BTU/scf. Alternatively, a first empirical way to verify the achievement of a magnecular structure is that of measuring the BTU content of the gas considered per scf because any increase over conventional values is a general indication of the achievement of a magnecular structure.

As one can see, the creation of hydrogen with a magnecular structure completely eliminates the need for its liquefaction in automotive and other uses because of the achievement of essentially the same range permitted by gasoline via the use of commercially available pressure tanks essentially of the same size as those of gasoline tanks.

A primary objective of this invention is therefore that of achieving the new chemical species of MagH™ hydrogen fuel with an average molecular weight of about 10. a.m.u.

A fully similar situation occurs for oxygen. In fact, the conventional molecule $O_2$=O—O has a molecular weight of 32 a.m.u. while clusters (O—O)xO, (O—O)x(O—O), (O—O)x(O—O)xO, etc. have corresponding molecular weights of 48, 64, 80, etc. In this case too the creation of a magnecular structure of the oxygen reduces its storage size by ⅕-th.

Another primary objective of this invention is, therefore, the creation of MagO™ oxygen with an average molecular weight which is at least a multiple that of $O_2$, with a corresponding increase of the BTU content.

Another important feature of magnecular structures is that they imply an increase of the energy release in thermochemical reactions generally bigger than the increase due to the increased molecular weight. This important feature is due to the following three primary aspects:

i) The presence in magnecular clusters of individual uncoupled atoms, as established by ample experimental evidence, which atoms combine at the time of the combustion, thus releasing energy. For instance, the presence of isolated H atom in a hydrogen magnecular cluster implies the esoenergetic reaction at the time of its combustion H +H→$H_2$ which releases 104 Kilo calories (Kcal) per mole. It is evident that this additional energy release is completely absent in a conventional molecular structure.

ii) Polarized atoms release energy in their thermochemical reactions in amount greater than that released by unpolarized atoms. Consider, for instance, the water molecule $H_2O$=H—O—H where the individual H—O and O—H dimer have the characteristic angle of 104 degrees. As it is well known, the orbitals of the two dimers H—O and O—H have a distribution which is perpendicular to the plane of the molecule H—O—H, as illustrated in FIG. 4. This implies that, in order to become part of the water molecule, an H atom must necessarily reduce its space distribution to a toroidal one, precisely as needed for this invention. It then follows that a polarized H atom require less energy to couple with the oxygen, or, more generally, the reaction $H_2+O_2$/ 2-H—O—H, when occurring among magnetically polarized atoms releases more than the conventional value of 57 Kcal/mole. The excess energy is spent by nature precisely for the removal of the space distributions of the orbitals.

iii) Magnetically polarized diatomic molecules with atoms possessing valence and non-valence electrons acquire new internal bonds due to the magnetic polarization of the internal non-valence electrons, with consequential additional energy storage. This feature has been proven for the case of the CO molecule (that with conventional triple valence bonds) exposed to intense magnetic field which shows under scans with IRD the presence of two new peaks which evidently characterize new bonds besides those characterized by conventional valence bonds. Since all available valence bonds are used in the CO molecule, the new bonds can only be explained with the toroidal polarization of the internal non-valence electrons resulting in new internal magnetic bonds North-South-North-South, as illustrated in FIG. 5. Since every bond of atoms implies an energy storage, it is evident that this third feature implies a third additional means for combustible gas with magnecular structure to have excess energy content.

It is then evident that the combustion of MagH™ hydrogen and MagO™ oxygen releases more energy than the combustion of conventional H and O gases, particularly when all three of the above features i), ii) and iii) are accomplished. Another important objective of this invention is therefore that of achieving magnetic polarizations sufficiently strong to caused said three features.

It is also evident that the same principle outlined above also apply for any other gas, and not necessarily to H and O gases only. In fact, the processing with the apparatus of this invention of any gaseous fossil fuel permits the increase of its molecular weight as well as of its energy output, thus permitting a consequential decrease of storage tanks, increase of performance and decrease of costs.

It should be indicated that the $H_3$ structure has already been detected in various GC-MS tests, although the structure is generally believed to be due to some form of valence bond. In depth studies have established that a triple valence bond would imply the violation of Pauli's exclusion principle (and other physical laws). In fact, the valence interpretation of the $H_3$ bond would imply the bond of a third electron to a pre-existing valence pair, resulting in the existence of at least two electrons with the same quantum numbers in the same energy level, an occurrence which would be a clear violation of Pauli's exclusion principle.

This and other violations of fundamental physical laws can be resolved with the interpretation that $H_3$ has the magnecular structure (H—H)xH. In this case only two electrons are bonded into a pair with the same energy although antiparallel spins as requested for singlet valence couplings, while the electron of the third H atom is magnetically bonded to one of the other two H atoms, thus being in an energy state different than that of the preceding valence pair with consequential lack of applicability of Pauli's exclusion principle.

Consider now the oxygen in which the $O_3$ molecule has been detected long ago and called ozone. In this case the $O_2$ molecule possesses free electrons for possible additional bonds into $O_3$. Nevertheless, studies have revealed that at least one realization of $O_3$ has the magnecular structure (O—O)xO with internal coupling similar to those of the magnecular cluster $H_3$=(H—H)-xH. This is again due to the fact that valence has been historically established solely for the correlation-coupling of two electrons. The addition of a third electron in the valence couplings generally violates Pauli's exclusion principle and other physical laws which prevent the existence of any possible triple valence bond.

It is evident that the experimental detection of $H_3$ and $O_3$ provides major credibility for the creation in this invention of H and O magnecular clusters with a molecular weight greater than 3.

The terminology described in this invention can be defined as follows: magnecular clusters are stable clusters of individual atoms, dimers and molecules bonded together by the attraction between opposite polarities of the toroidal polarization of the orbits of peripheral atomic electrons; "specific density" is the density of a conventional gas composed by the same molecules measured in atomic mass units (a.m.u.) per standard cubic feet (scf); "average specific density" is the density of a gas with magnecular structure, thus having generally different cluster constituents when measured also in a.m.u./scf; the "energy content" is the heat produced by one standard cubic feet (scf) of a combustible gas when measured in British Thermal Units (BTU); an "apparatus" is, for this invention, an equipment permitting the industrial production of gases with magnecular structure; a "piping system" is a set of interconnected pipes permitting a common flow; "electrodes" are a pair of conductors permitting an arc between a gap at their tip; "gas" is referred to a substance which is at the gaseous state when at room temperature and pressure; a "vapor" is referred to a substance which is liquid at room temperature but which acquires its gaseous phase at a sufficiently high temperature; a "gaseous hydrocarbon" is a combustible gas whose chemical composition is that of hydrocarbons, such as natural gas, methane, acetylene; a "slit", also called in this invention a "Venturi" is a restriction in the flow of a gas with a rectangular sectional area and a minimal width; all other definitions of "electric current", "pressure", "volume", etc. are standard.

SUMMARY OF THE INVENTION

One embodiment of the invention is an apparatus and method for increasing a molecular weight and an energy content of a gas comprising providing a pressure resistant piping system equipped with means for closing and opening said piping system, the means typically being valves; providing means for filling up said piping system with a gas and means for compressing said gas to a desired pressure; providing at least one pair of electrodes placed within said piping system and capable of delivering an electric arc within an interior of the piping system; providing means for delivering an electric power to each of said at least one pair of electrodes; providing means for recirculating said gas through said electric arc; providing means for collecting a resultant processed gas; and filling said piping system with the gas, recirculating the gas through the electric arc generated by the at least one pair of electrodes and collecting the resultant processed gas, wherein the resulting processed gas has an average molecular weight and an energy content bigger than corresponding values of the gas originally first filled into the piping system.

In this embodiment, the electric current of said arc is continuous, alternating or pulsing. The gas can be hydrogen, oxygen, a non-combustible or inert gas, a gaseous hydrocarbon fuel or a liquid vapor. The flow of the gas is preferably restricted with means for restricting the flow of said gas along a slit surrounding said arc.

A still other embodiment is an apparatus and method for increasing a molecular weight and an energy content of a gas comprising providing a pressure resistant piping system equipped with means for closing and opening said piping system; providing means for filling up said piping system with a gas and means for compressing said gas to a desired pressure; providing at least one solenoid acting on a tube or capillary tube in line with said piping system; providing means for delivering an electric current to said at least one solenoid; providing means for cooling said solenoid; providing means for recirculating said gas through said tube; providing means for collecting a resultant processed gas; and filling said piping system with the gas to be processed, compressing said gas to the desired pressure, subjecting said gas to the current of the at least one solenoid acting on the tube while the gas is being recirculated through said tube and with the cooling means activated, and collecting said resultant processed gas, wherein a resulting processed gas has a molecular weight and an energy content bigger than corresponding values of the gas first filled into the piping system.

In this embodiment, the electric current of said solenoid is continuous, alternating or pulsing. The gas may be hydrogen, a non-combustible or inert gas, a gaseous hydrocarbon fuel, or a liquid vapor. A number of solenoids may be placed in series and a number of solenoids may be placed in parallel within the piping system.

The invention also deals with apparatus and a method for producing a hydrogen gas with an increased molecular weight and an increased energy content comprising providing a pressure resistant vessel filled up with a liquid feedstock rich in hydrogen; providing at least one pair of electrodes placed in such a way to create a submerged electric arc; providing means for delivering an electric power to said at least one pair of electrodes; providing means for collecting a combustible gas produced by said submerged electric arc; providing means for separating a hydrogen content of said combustible gas, the hydrogen content comprising the produced hydrogen gas; and subjecting the liquid feedstock to the submerged electric arc, collecting the combustible gas, and separating the hydrogen content of the combustible gas produced to obtain the resultant processed hydrogen gas, wherein the resultant processed hydrogen gas has a molecular weight and energy content greater than a corresponding value for conventional hydrogen gas.

The produced hydrogen gas can be separated from the combustible gas with filtration means or with means for cryogenically liquefaction of remaining components.

Another embodiment of the invention is an apparatus and method for increasing the voltage, power and efficiency of a fuel cell comprising operating a fuel cell with a processed gas which has a molecular weight and an energy content bigger than corresponding values of an original gas prior to being processed. The processed gas is made by recirculating the original gas in a pressure resistant piping system, by compressing said original gas to a desired pressure, and by subjecting the recirculated original gas to generated electric arcs created by at least one pair of electrodes within an interior of the piping system. The original gas is one of hydrogen and oxygen. The processed gas is MagH™ hydrogen fuel when hydrogen is the original gas and MagO™ oxygen gas when oxygen is the original gas.

Another embodiment is an apparatus and method of operating an internal combustion engine with a decreased need for atmospheric oxygen comprising operating the engine with a processed fuel made from a processed hydrogen gas, the processed hydrogen gas having a specific weight and energy content greater than a corresponding value for conventional hydrogen gas. The processed hydrogen gas is made by filling a pressure resistant vessel with a liquid feedstock rich in hydrogen, by subjecting said feedstock to submerged electric arcs between at least one pair of electrodes, by collecting a combustible gas produced by a thermochemical reaction of the electric arcs on the feedstock, and by separating the processed hydrogen gas from said combustible gas.

The processed hydrogen gas is separated with filtration means. The processed hydrogen gas may also be separated using means for cryogenically liquefaction of remaining components. The processed fuel also includes the processed hydrogen gas in the presence of carbon and oxygen, and the processed hydrogen is the magnecular cluster form of hydrogen fuel.

BRIEF DESCRIPTION OF DRAWINGS

FIG. 15 depicts the results of analytic measurements of hydrogen with a magnecular structure.

DETAILED DESCRIPTION OF THE INVENTION

As indicated earlier, the magnetic polarization of the orbitals of peripheral atomic electrons requires extremely strong magnetic fields of the order of billions or trillions of Oersteds which are simply not possible with current technologies in large scale, that is at distances of the order of inches or feet, even with the use of superconducting solenoids cooled with the best available cryogenic technologies.

As an illustration, the intensity of the magnetic fields needed to create an industrially meaningful magnetic polarization is of the order of a million times bigger than the most powerful magnets available in a U.S. National Magnetic Laboratory, in Tallahassee, Fla.

The only possible, industrially useful means of achieving magnetic fields of the needed very high intensity are those based on large direct current (DC) measured in Amperes (A) when considered at atomic distances. In fact, with respect to FIG. 6 the magnetic field created by a rectilinear conductor with current I at a radial distance r is given by the law B=kI/r, where the constant k in absolute electromagnetic unit is 1. It then follows that, for current in the range of $10^3$ and distances of the order of the size of atoms r=$10^{-8}$ cm, the intensity of the magnetic fields H is of the order of $10^{13}$ Oersted, thus having intensity values fully sufficient to cause the magnetic polarization of the orbitals of peripheral atomic electrons.

The main principle of this invention is therefore that of achieving the magnetic polarization of the orbits of peripheral atomic electrons by flowing gases through electric currents as technologically possible. This principle can be best realized by recirculating the gas through one or more electric arcs. The efficiency of the equipment then depends on the achievement of a sufficiently high Amperes as well as of a sufficiently high operating pressure. The achievement of an essentially pure population of a magnecular structure of a given gas with the desired molecular weight then requires its recirculation through said electric arc for a period of time depending on the selected gas, the selected current and the selected operating density.

Figure 6:
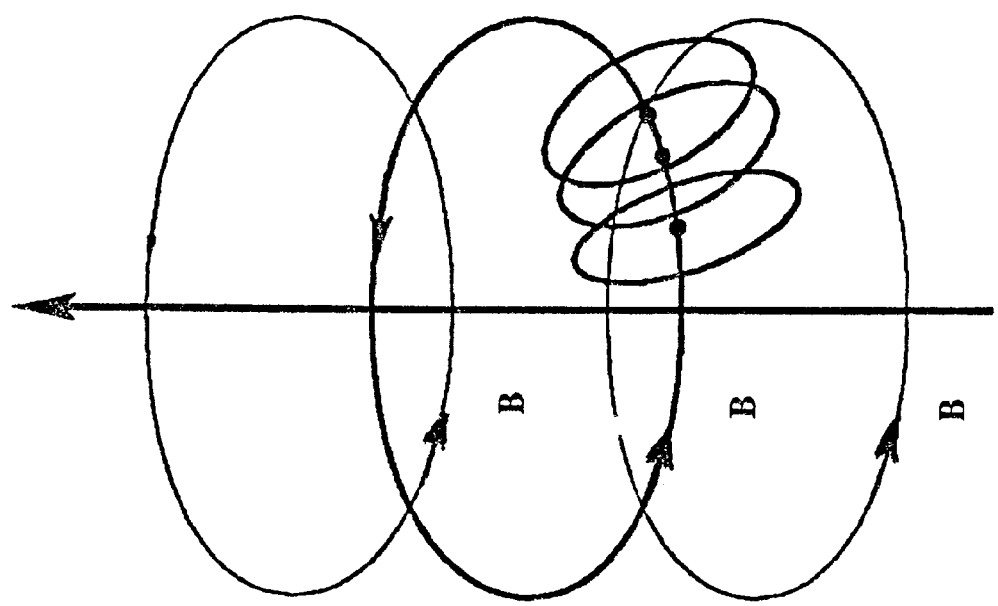
FIG. 6 depicts the strong magnetic field at atomic distances from an electric arc.

In fact, under the above conditions schematically represented in FIG. 6, atoms with the toroidal polarization of their orbitals find themselves aligned one next to the other with opposing polarities. Therefore, the latter attract each other, thus forming the magnecular clusters. The flow of the gas through the electric arc then removes the the magnecular clusters immediately following their creation. The electric arc decomposes the original molecule, thus permitting the presence of isolated atoms in the magnecular structure as needed to increase the energy output.

In this way, the process transforms the original gas with its conventional molecular structure into a new chemical species consisting of individual atoms, dimers and complete molecules all bonded together by the magnetic polarization of their peripheral atomic electrons.

Figure 1:
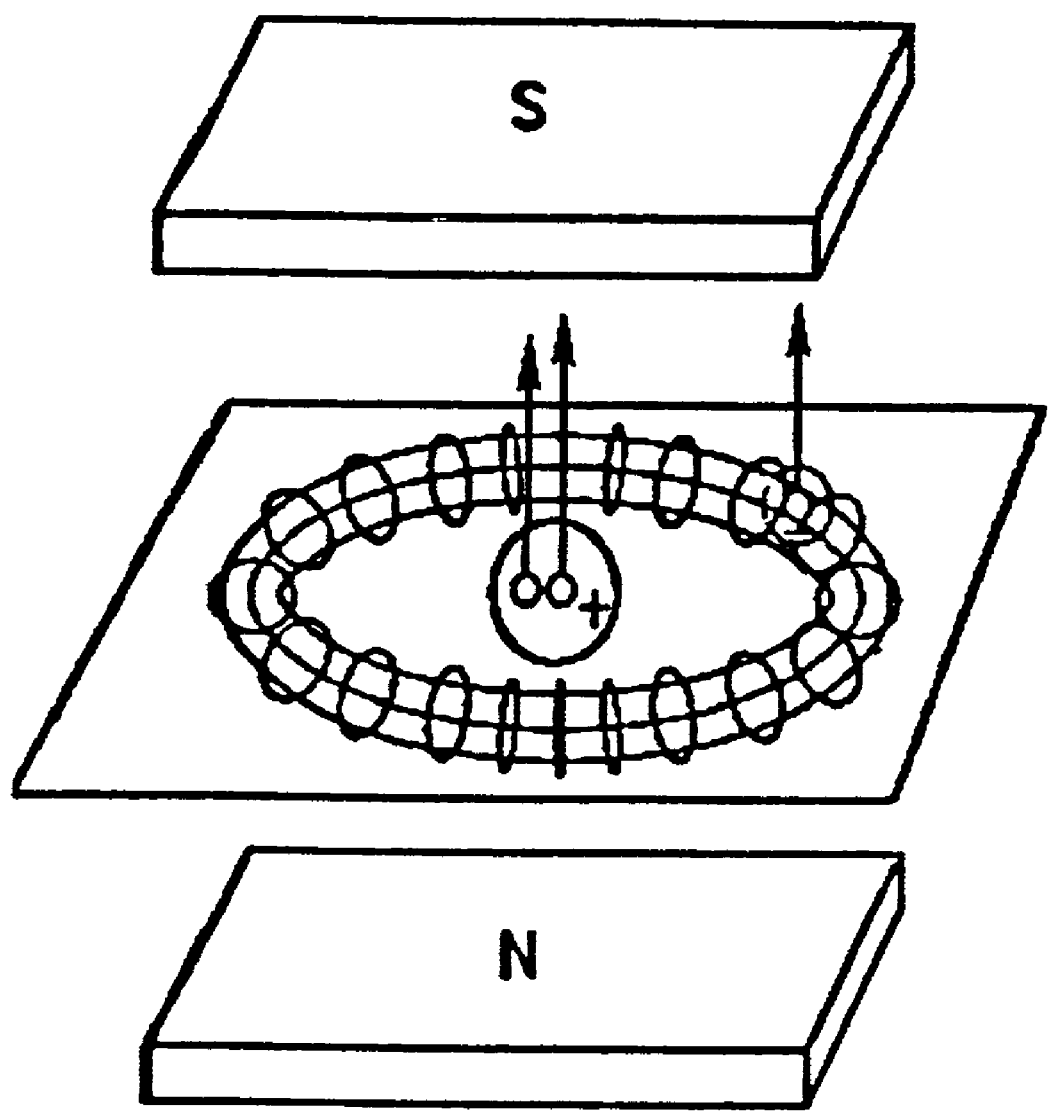
FIG. 1 depicts the toroidal distribution of the orbits of atomic electrons under a strong external magnetic field.
Figure 2:
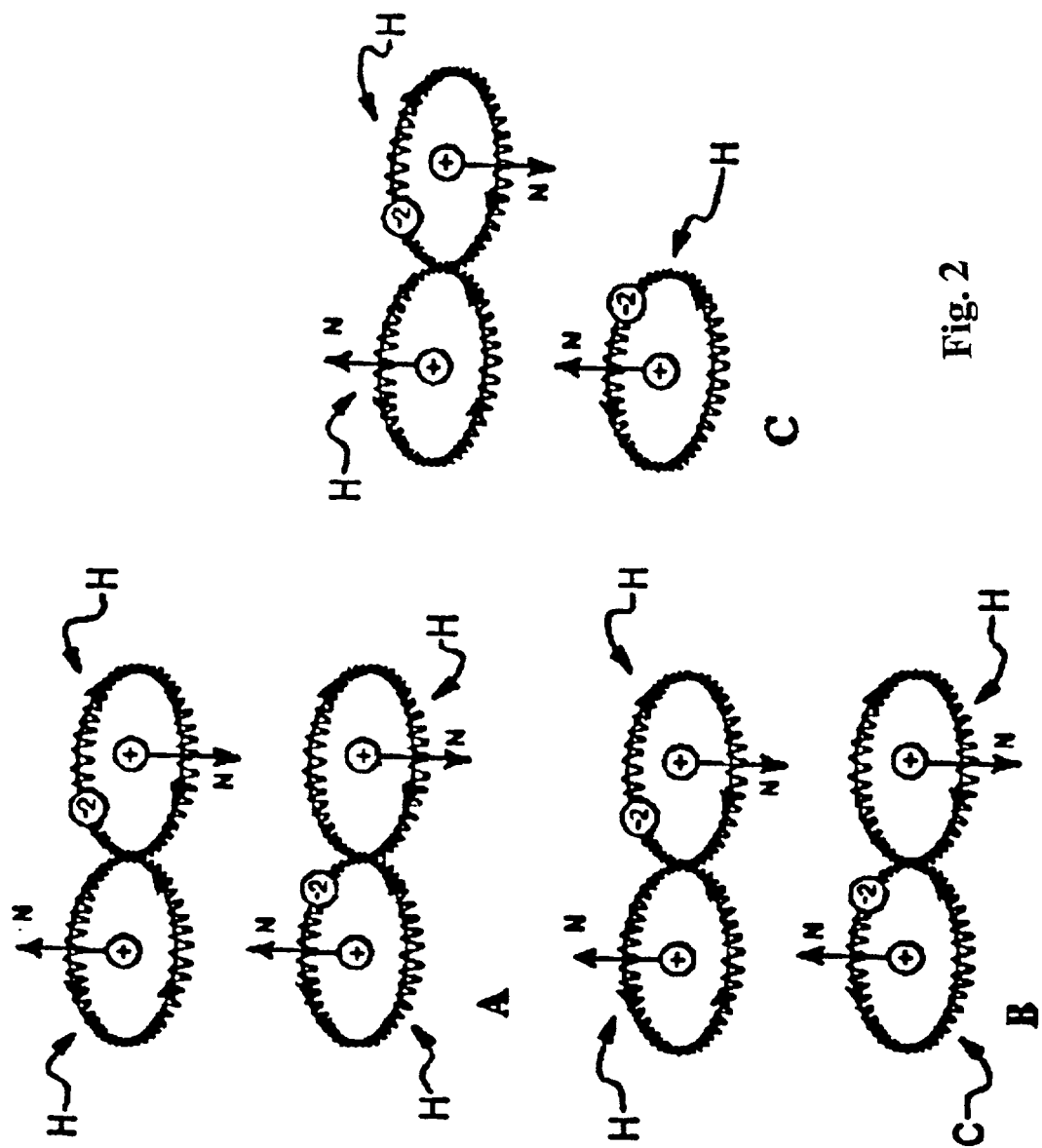
FIG. 2 depicts the bonding of magnetically polarized atoms to each other via opposite magnetic polarities.
Figure 3:
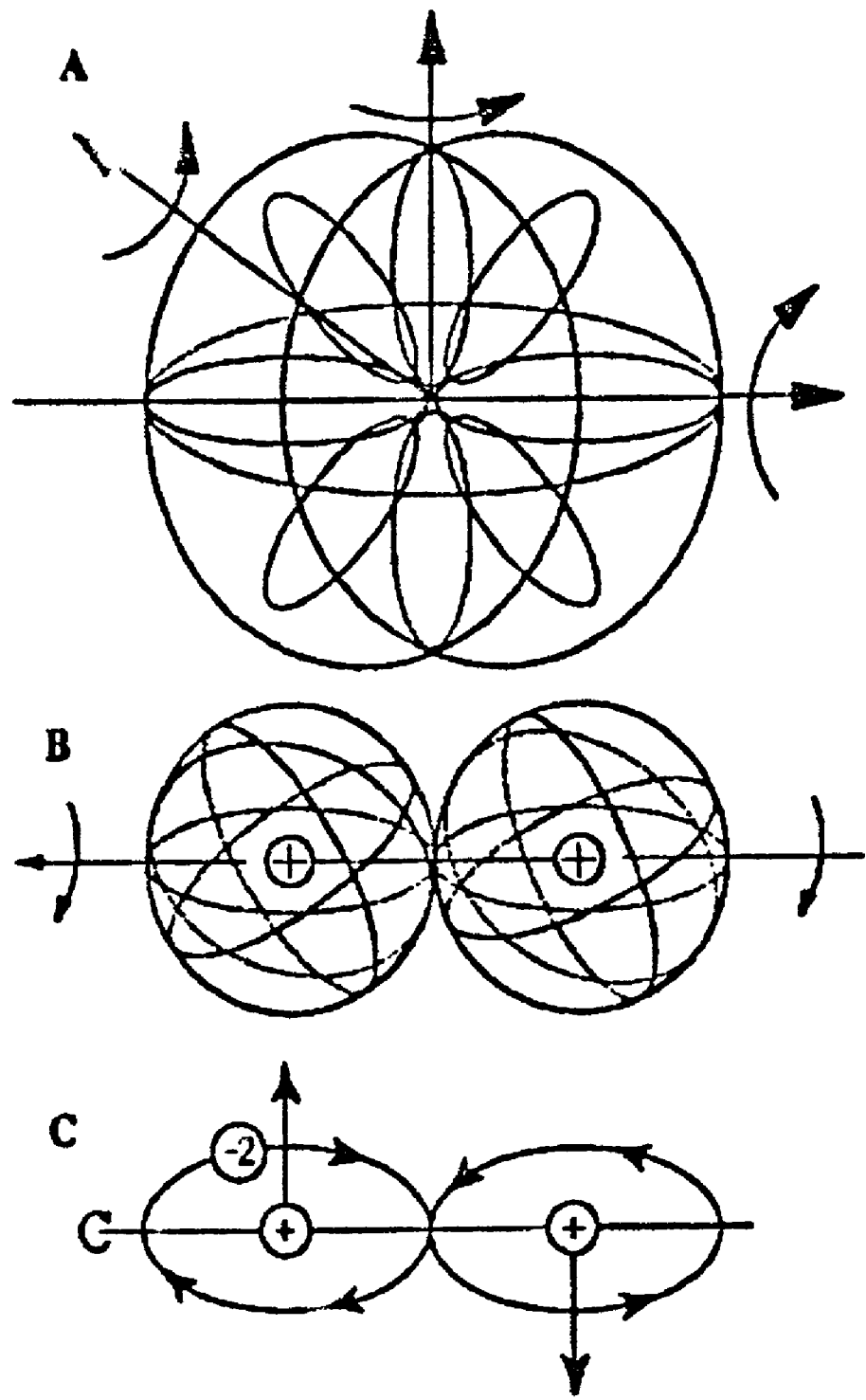
FIG. 3 depicts the polarization of a hydrogen molecules with opposite magnetic moments in the two atoms.
Figure 4:
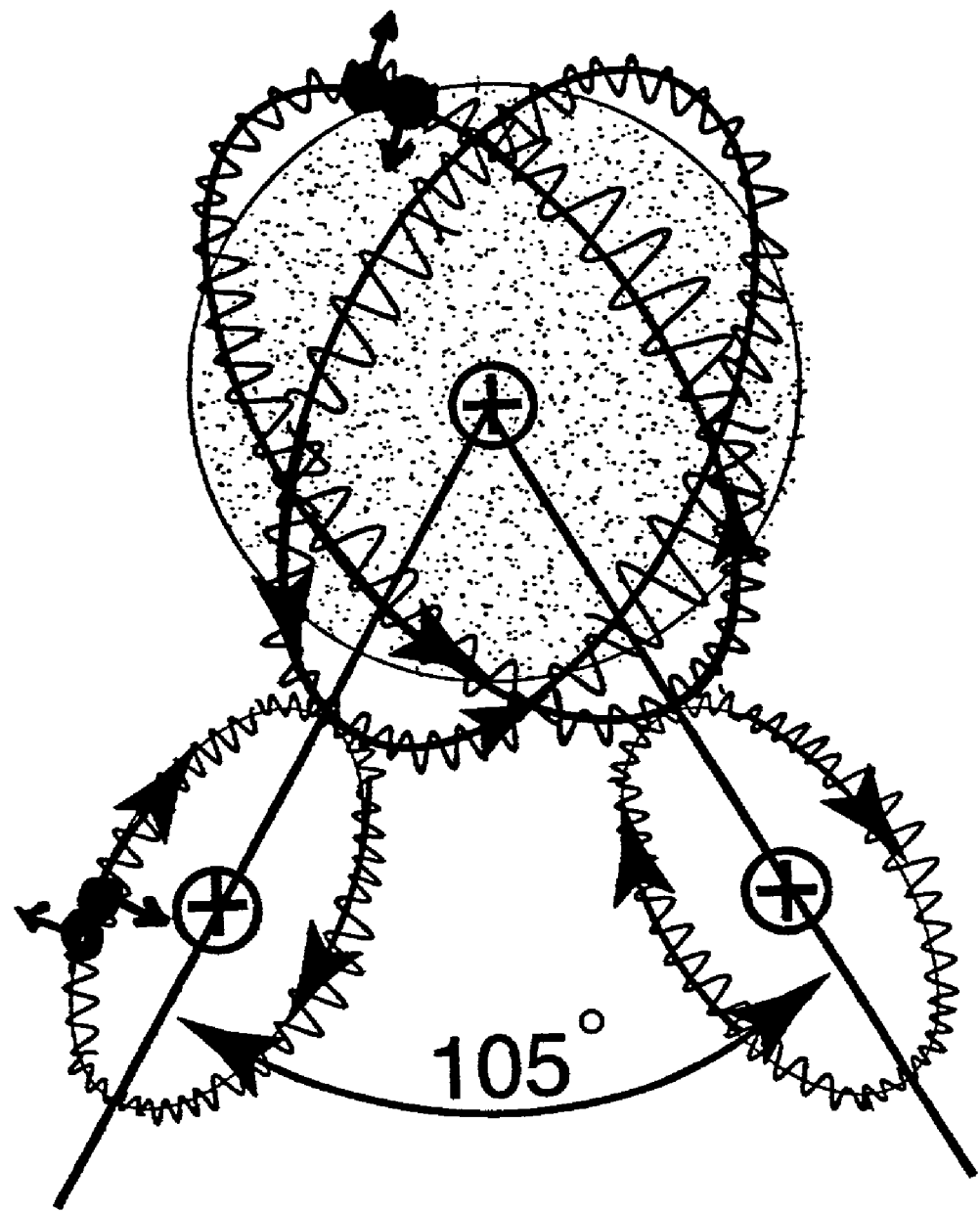
FIG. 4 depicts the water molecule with the orbits of valence electron pairs and their opposite rotations in different coupled atoms.
Figure 5:
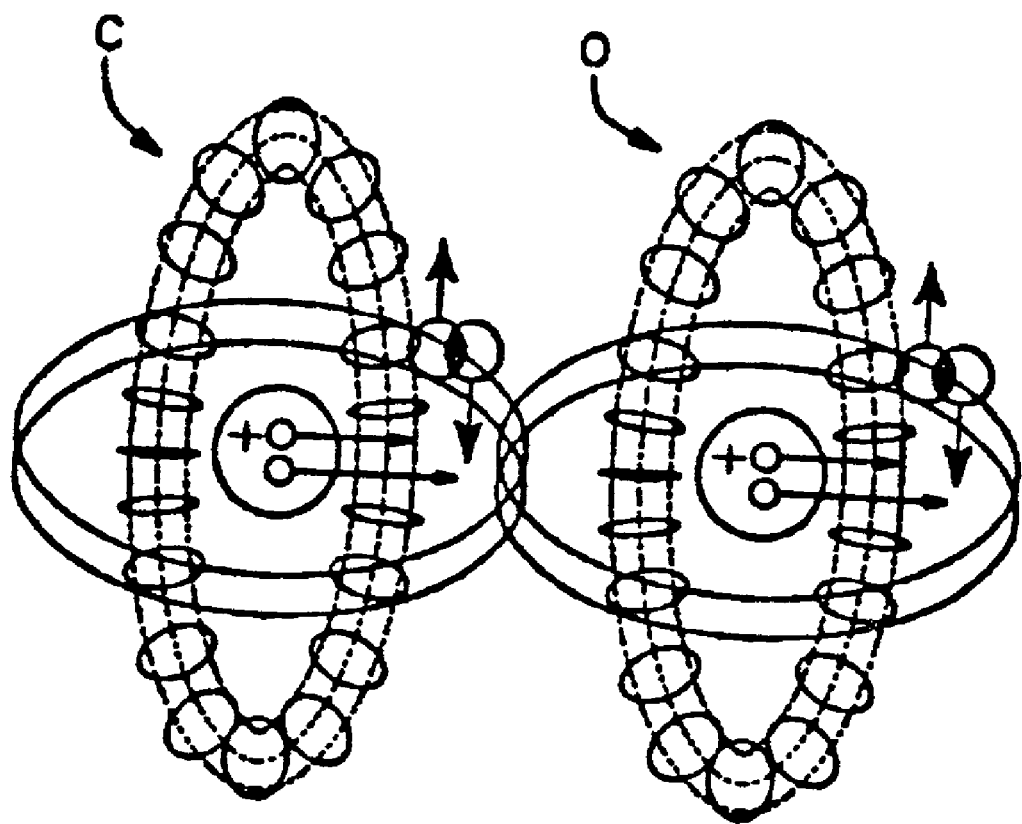
FIG. 5 depicts new internal magnetic bonds in diatomic molecules.

In the event the original gas has a simple diatomic molecular structure, such as $H_2$, the magnecular clusters are composed of individual polarized H atom and ordinary polarized molecules $H_2$ as in FIG. 2. In the event the original gas has the more complex diatomic structure, the magnecular clusters are composed of individual polarized O atoms, OO single bonds, and $O_2$ molecules with additional internal bonds as in FIG. 5. In the event the original gas has the more complex diatomic structure CO, the magnecular clusters are more complex and are generally composed of individual atoms C and O, single and double bond C—O, and conventional molecules CO and $O_2$ with internal new bonds. Original gases with more complex conventional molecular structure evidently imply more complex magnecular clusters with all possible internal atomic arrangements.

It is also evident that, after completing the processing in the apparatus of this invention, the resulting new species is not composed of all identical magnecular clusters, as it is the case for molecules, but instead of a variety of magnecular clusters from a minimum to a maximum number of atomic components. The molecular weight of the magnecular gas is then given by the average molecular weight of all different magnecular clusters.

Figure 7:
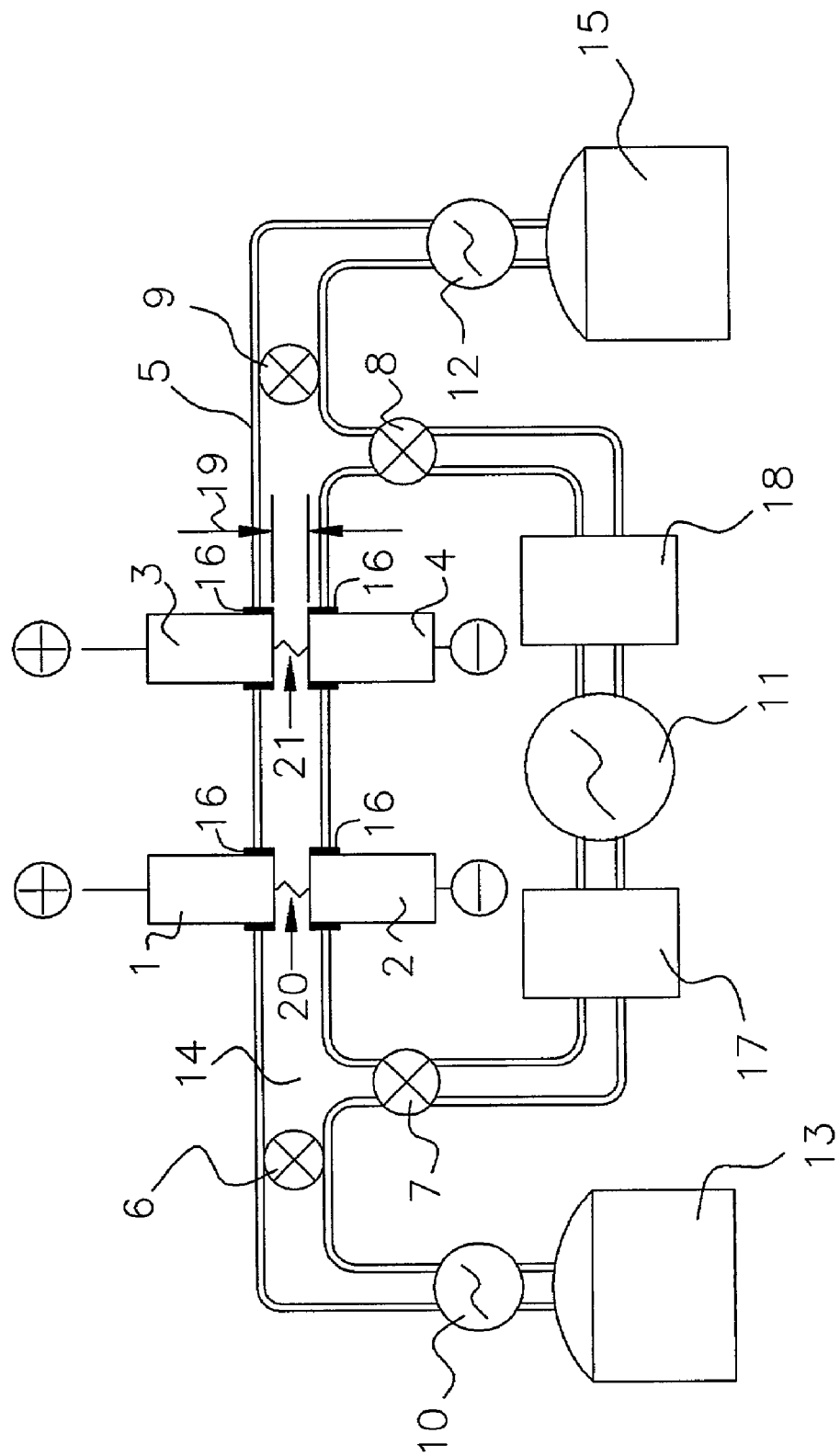
FIG. 7 depicts a typical application of a preferred embodiment of this invention.

A first preferred embodiment of this invention is depicted in FIG. 7 and comprises: one, two or several pairs of positively and negatively charged electrodes 1 and 2, 3 and 4, here assumed to be composed of tungsten rods of ½" outside diameter and 3" in length with tip configuration depicted in FIG. 8 as described below; commercially available DC power units of 50 Kwh (not shown in the drawings for simplicity), one per each electrode pair; a pipe system 5 typically of ½" internal diameter and ¾" outside diameter composed of a diamagnetic metal or other nonconducting material suitable to withstand an internal pressure of least 4,500 psi; said electrode pairs are placed as a fixed part of piping system 5 via pressure resistant seals 16 in such a way to create the biggest possible gaps 19, permitted by the selected 50 Kwh power unit and the selected gas at the selected operating pressure, which gap, for the case of hydrogen and oxygen (gas 14) at the selected operating features is of the order of ½"; four on-off high pressure valves 6, 7, 8, 9 at the indicated locations; three high pressure pumps 10, 11, and 12; two tanks 13, 15 of at least one scf each capable of withstanding at least 4,500 psi and located in line with piping system 5; and two commercially available high pressure gas cylinders 17, 18 connected as shown in the piping system 5.

Figure 8:
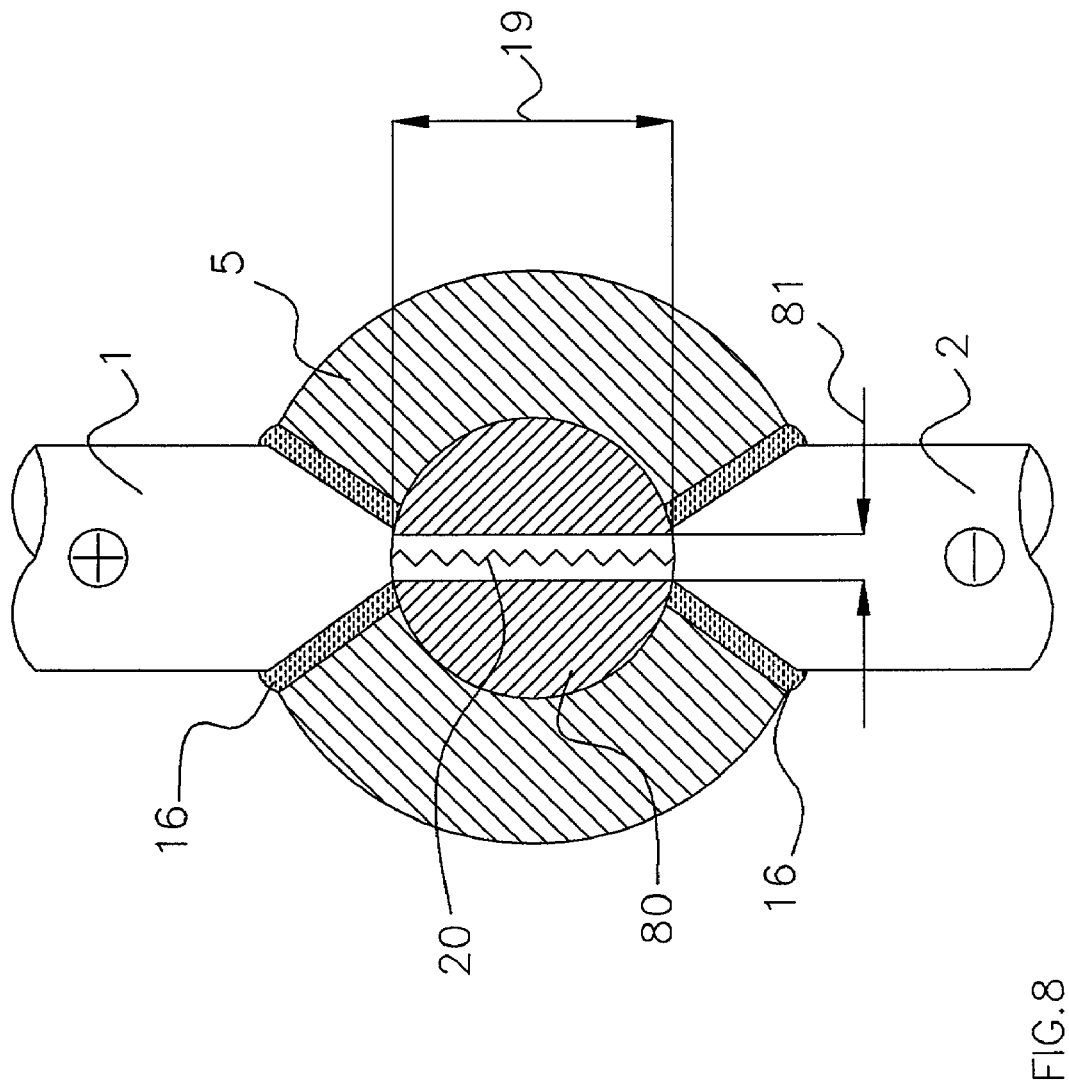
FIG. 8 depicts a Venturi restricting the flow of a gas through an electric arc.

FIG. 8 depicts the sectional view of the equipment at the axial line of electrodes pair 1 and 2, showing: the ½" by ¾" pipe 5; seals 16 for the high pressure assembly of electrodes 1 and 2 in the piping system 5; the ½" electrode gap 19; the ½" long DC electric arc 20; and restriction 80 (also called Venturi) which restricted the flow through arc 20 from the ½" circular sectional area to a rectangular area surrounding the electric arc 20 for a sectional area of about ½" in length and ¹⁄₁₆" in width 81.

The operations of this first preferred embodiment is as follows. The operation initiate with valve 6 closed and all valves 7, 8, 9 open after which a high vacuum is pumped out of the piping system 5 including tank 15. Then, valve 9 is closed to isolated tank 15; tank 13 filled up with the desired gas at 4,500 psi is connected to the system; valve 6 is open so as to fill up the entire system at which point the pressure is equalized everywhere; pump 10 is then operated to empty the content of tank 13 into the piping system 5 and related storage tanks 17 and 18. At that point, valve 6 is closed; the DC current is sent to all electrode pairs, thus establishing arcs 20, 21; finally, pump 11 is activated for the desired duration of time, generally being of at least one hour.

According to the above apparatus, the selected gas is continuously flown by pump 11 through Venturis 80 in the immediate longitudinal vicinity of DC electric arcs 20, 21, by therefore exposing said gas to the DC electric arc according to the main principle of this invention. Assuming that the 50 Kwh power unit has 25% loss in the AC-DC rectification, the equipment has 37.5 Kwh of DC electric power available at each arc. Since another principle of this invention is the maximization of the electric current, the arc is operated at about 37 V, thus permitting 1,000 A in each arc. These operating features can be continuously supported by tungsten electrodes. The continuous recirculation of the gas through Venturis 80 for one hour has the following implications: by exposing the atoms to the extreme magnetic fields in the immediate vicinity of the arc, thus polarizing their electron orbits into toroid; aligned polarized atoms as in FIG. 5 bond to each others; and there is the consequential formation of magnecular clusters with the resulting achievement of the desired increase of the molecular weight and energy content as illustrated in the experimental evidence outlined below.

The increase in the molecular weight and energy content can be achieved in a number of ways, such as: the use of the above described equipment for several hours, e.g., for one full day; the use of AC-DC rectifiers with power much bigger than 50 Kwh; the use of pulse DC power units; the use of a large number of pairs of electrodes sequentially exposed to the same gas flow; a capillary restriction 81 around the electric arcs; and other means, as well as any of their combinations.

Figure 9:
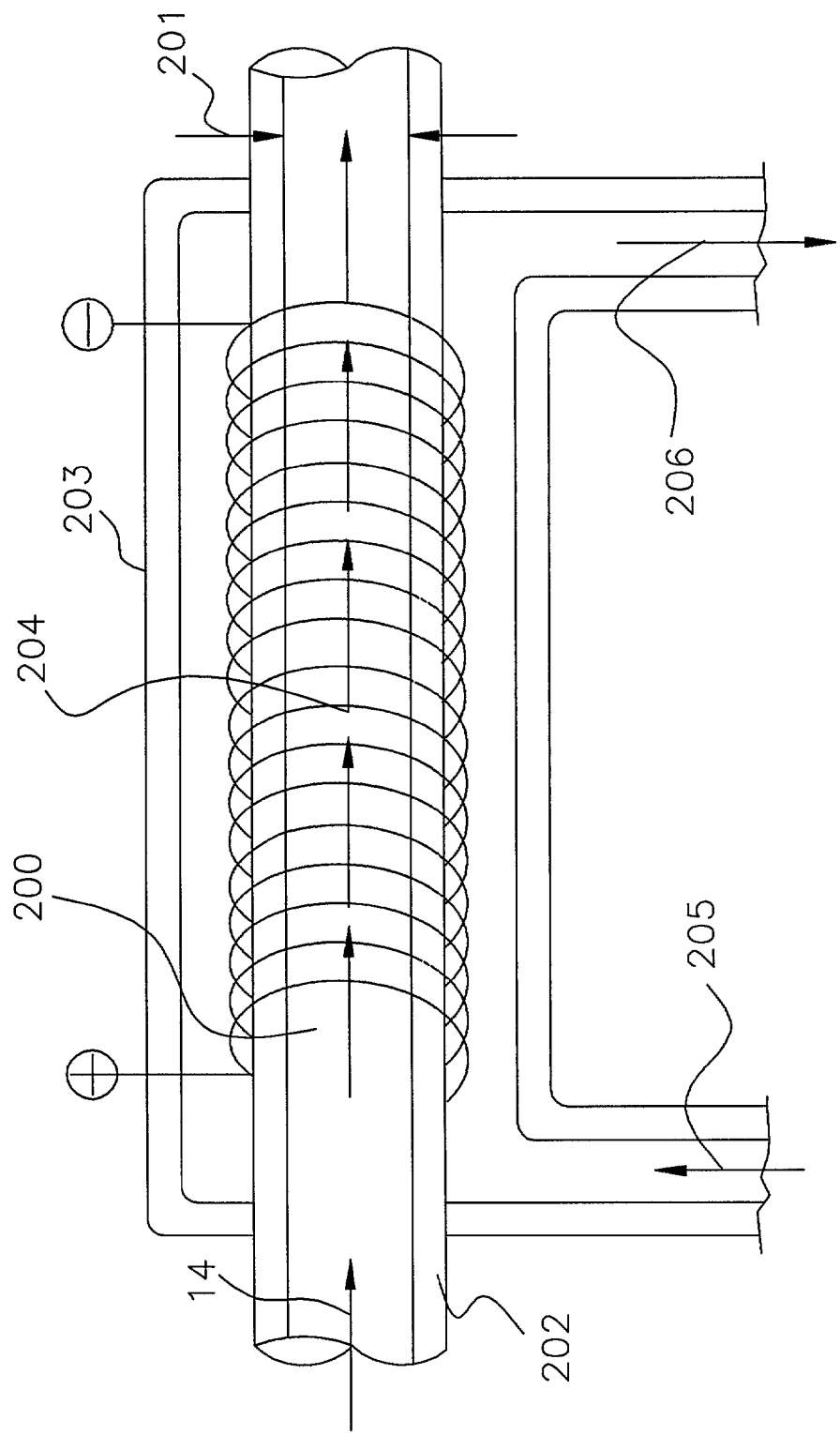
FIG. 9 depicts a superconducting supercooled solenoid.

Another embodiment is depicted in FIG. 9 consisting of the equipment of FIG. 7 in which the DC electric arc between electrodes is replaced by superconducting solenoid 200 with capillary or tube internal diameter 201 equipped with an adequate cooling systems is schematically represented by vessel 203 with inlet 205 and outlet 206 encompassing the entire solenoid 200 and is filled up by a flowing coolant 204, such as liquid nitrogen.

The difference between the embodiment of FIG. 9 and that of FIG. 7 is the following. The latter embodiment acts according to the circular configuration of the magnetic field of FIG. 6, while the former embodiment acts according to a linear configuration of the magnetic field along the symmetry axis of the solenoid with intensity $B=nI/r$, where n is the number of turns, I is the current in Amps and r is the radius of said tube 201. It is evident that the linear alignment of magnetically polarized atoms along the direction of its flow favors the creation of magnecular clusters as compared to the circular alignment of FIG. 6, particularly when the equipment is operated, for instance, at pulses of 50,000 A with a radius of tube 201 of $10^{-5}$ mm.

However, the selection of the preferred equipment depends on the specific needs. For instance, the embodiment of FIG. 9 cannot breakdown the original molecules, thus forming the magnecular clusters essentially composed of molecules with individual polarized atoms. By comparison, the electric arc of the apparatus depicted in FIG. 7 does indeed separate conventional molecules, thus forming magnecular clusters, which generally contains atoms, dimers and molecules.

Needless to say, the embodiment of FIG. 9 can be improved in a variety of ways, e.g., by having several embodiments of the same type connected in series to increase the magnecular structure, all various series being connected in parallel to increase the production. These series and parallel configurations are not indicated in the drawing because quite elementary and definitely known to skilled in the art.

The use of the MagH™ hydrogen fuel and MagO™ oxygen produced by the above embodiments is evidently multifold and include as representative examples without limitations: use of the magnecular clusters of hydrogen fuel and oxygen in fuel cells; use of the magnecular clusters of hydrogen fuel as fuel for internal combustion engines; use of the magnecular clusters of hydrogen fuel as fuel for electric generators; use of the magnecular clusters of hydrogen fuel and oxygen in their liquefied form as fuels for rockets.

In all cases the advantages in the use of the magnecular clusters of hydrogen fuel and oxygen over the use of conventional gases are numerous. For instance, the use of the magnecular clusters of hydrogen fuel and oxygen as liquefied rocket fuel implies: 1) a reduced cost of liquefaction, evidently due to the increases in molecular weight and other factors; 2) an increased energy output; and 3) an increase of the payload or, equivalently, a decrease of the fuel for the same payload. All these advantages evidently depend on the achieved degrees of magnecular structure.

It should be indicated that the apparatus above described is also applicable to conventional gaseous hydrocarbon, such as natural gas, methane, acetylene, etc. In fact, the equipment of this invention can also be filled up with any of these gaseous hydrocarbons and reach the same results, such as an increase of the molecular weight and energy. Moreover, it should be noted that, in this particular case, the electric arc breaks down the polymer chains of hydrocarbons $(C-H_2)-(C-H2)-(C-H_2)-$ . . . and rearranges then into magnecular clusters $(C-H_2)x$ $(C-H)xHx(C-H_2)x$ $(C-H_2)x$ with the environmental major advantage of turning the original polluting fuels into a clean burning fuel.

It should be finally indicated that this invention is equally applicable to noncombustible gases, such as helium, nitrogen, argon, etc. in which case the dominant advantage is evidently the increase of molecular weight with consequential decrease of storage volumes, and related logistic advantages. It should be noted that, even though non-combustible, these gases can also store energy via the internal magnetic bonds of the type depicted in FIG. 5, which energy is evidently released under the form of heat whenever the magnecular structure is removed.

Figure 10:
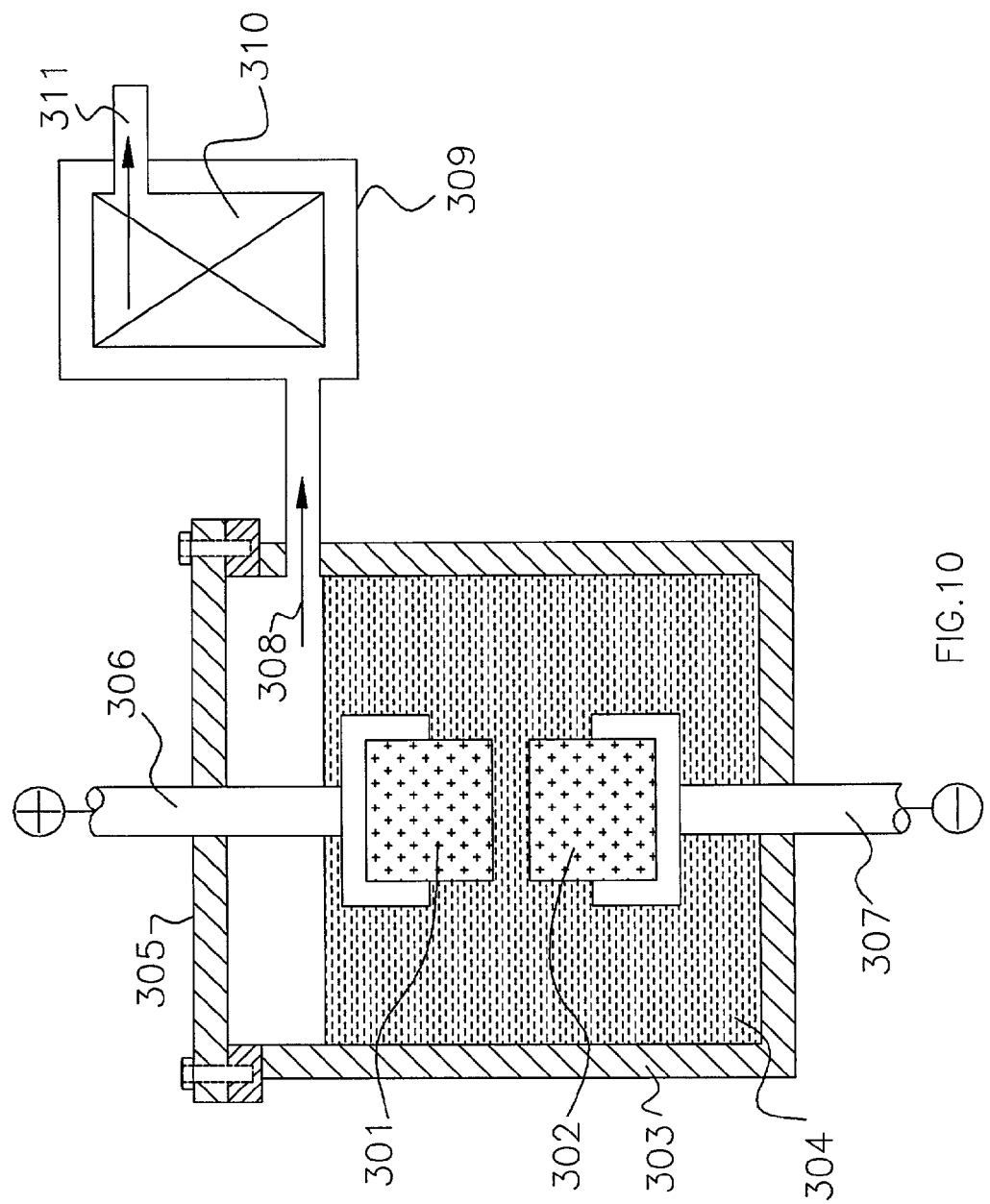
FIG. 10 depicts an alternative embodiment of this invention for the production of a hydrogen gas with magnecular structure obtained via filtration.

Another embodiment for the production of gases with the desired magnecular structure is given by known means for the production of a combustible gas via electric arcs operating within water or other liquids, and then the separation of a desired gas from said combustible gas via filtering, cryogenic liquefaction or other means. A first embodiment of this type is depicted in FIG. 10 and comprises: carbon-base electrodes 301 and 302 submerged within a liquid 304 which is contained in a pressure vessel 303 with removable lid 305, said electrodes 301 and 302 being housed in copper holders 306 and 307 which protrude outside of vessel 303 and lid 305 through seals not shown in the figure for simplicity, but which are well known to skilled in the art.

The activation of a DC electric arc within a selected liquid decomposes its molecules and creates a combustible gas with a magnecular structure, as now well established. Said combustible gas exits vessel 303 through opening 308 and then passes through high pressure pipes into a metal container 309 in which there is a special filter 310 selected in such a way to remove the unwanted part of said combustible gas. The remaining gas is released through outlet pipe 311 for collection.

As an example, underwater electric arcs produce a combustible gas which, as far as the atomic percentage is concerned, is composed of 50% H, 25% O and 25% C. These atoms are then combined into magnecular clusters generally composed of H, C and O individual atoms, HO, CH and C—O dimers with one single valence bond, and ordinary molecules of $H_2$, CO, $H_2O$ and $O_2$. Since hydrogen is the biggest component of the combustible gas, it can be effectively filtered with various means, resulting in magnecular clusters of hydrogen. In fact, experimental evidence has establishes that magnecular clusters survive filtering.

Numerous micrometric filtering systems 310 are currently available. As an indication without un-necessary limitations, a filtering system recommendable for the separation of in magnecular clusters of hydrogen is given by a 5 Armstrong zeolite consisting of a microporous molecular sieve, which essentially selects a gas via "molecular sieving," or molecular size exclusion. After a number of hours of operation depending on the DC power unit, the operating pressure and the size of the zeolite filter, the latter is replaced as part of routine service.

Figure 11:
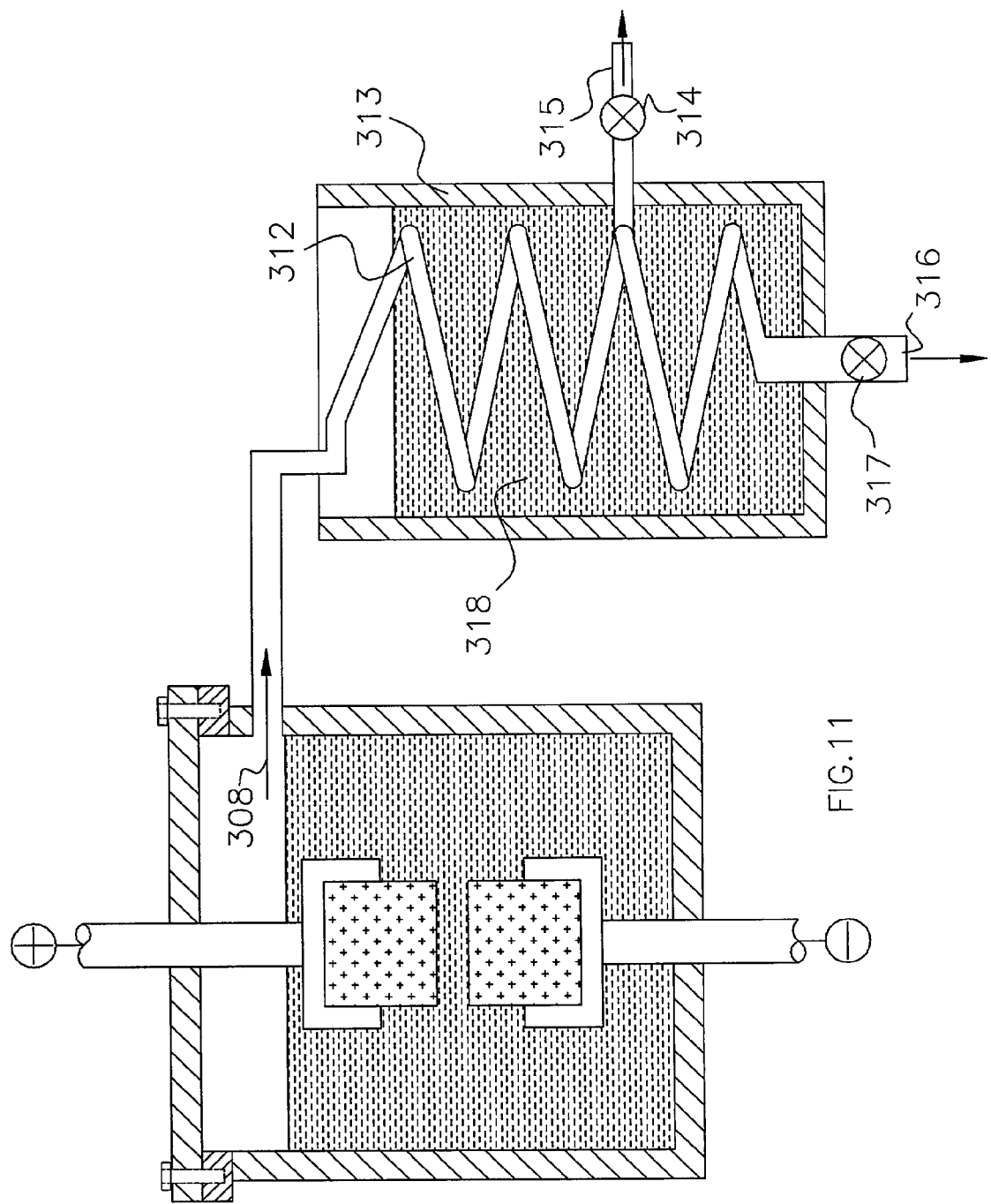
FIG. 11 depicts an alternative embodiment of this invention for the production of a hydrogen gas with magnecular structure obtained via liquefaction.

An alternative embodiment is depicted in FIG. 11 and essentially consists of the same embodiment of FIG. 10 for the production of a combustible gas via an electric arc submerged within a liquid, plus: a serpentine 312 in which the combustible gas is passed following its exit from vessel 303 through outlet 308; a vessel 313 containing said serpentine 312; a coolant 318 filling up said vessel 313; valves 317 and 314; plus outlet 316 for the a liquefied portion of the gas and outlet 315 for its remaining non-liquefied gaseous component.

To illustrate the operation of the alternative embodiment of FIG. 11, suppose that liquid 304 is ordinary water. In this case, as indicated earlier, the combustible gas has a magnecular structure composed by H, C and O. By recalling that hydrogen liquefied very close to absolute zero degrees temperature, its separation from the combustible gas can be achieved by cooling the gas to about minus 70 degrees F., at which CO is liquefied. Said cooling can be achieved via the use of liquid nitrogen for coolant 318 or other liquid having the needed low temperature or any of the several, commercially available cryogenic equipment not shown in the figure because they are well known to skilled in the art. In this way, the liquefied component of the combustible gas exists at outlet 316, while magnecular clusters of hydrogen fuel exits at outlet 315. Valves 317 and 314 are used to optimize operations.

It is evident that the equipment of FIGS. 10 and 11 produce a form of magnecular clusters of hydrogen fuel and other clusters of gases less pure as compared to those produced via the equipment of FIGS. 7, 8, 9, evidently because of impurities containing C and O atoms which should be expected in the production via the equipment of FIGS. 10 and 11 but not with those of FIGS. 7, 8, 9. Therefore, the selection of the equipment depends, again, on the selected application. In fact, for automotive uses of magnecular clusters of hydrogen fuel as fuel for internal combustion engines the presence of C and O atoms is definitely desirable because such presence increases the energy content while decreasing the need of atmospheric oxygen. Therefore, the hydrogen fuel produced via the filtration or cryogenic cooling of the clusters of gases per the equipment of FIGS. 10 and 11 is definitely preferable for use as fuel for internal combustion engine as compared to the forms of hydrogen fuel produced via the equipment of FIGS. 7, 8, and 9. On the contrary, the latter methods are preferable over the preceding ones for use of the process hydrogen fuel and oxygen in fuel cells since the purity of the final form of the process hydrogen fuel and oxygen is guaranteed by that of the original gas.

It is now important to review the experimental evidence on the main results of this invention. First, the inventor constructed an apparatus as per FIG. 7 by using for arcs the sparks produced by four automotive spark plugs placed in series on piping system 5, said spark plugs being operated by a conventional coil by automotive battery with 12 V, 800 A. The equipment was operated at 15 psi. Two samples of oxygen which were produced, and denoted processed oxygen 1 and processed oxygen 2, by passing them through said array of four sparks for 30 minutes.

The two samples were tested in lieu of ordinary oxygen in a 2-cell Proton Exchange Membrane (PEM) fuel cell with dimensions 7×11×11 cm, which cell was operated with conventional high purity hydrogen. The membrane material was Nafion 112; the catalyst in the electrodes was platinum acting on carbon; the plates for heat transfer were given by two nickel/gold plated plates; the temperature of the fuel cell was kept constant via ordinary cooling means; current was measured via a HP 6050AA electronic load with a 600 W load module; a flow rate for oxygen and hydrogen was assigned for each current measurement; both oxygen and hydrogen were humidified before entering the cell; the measurements reported herein were conducted at 30 degrees C.

Figure 12:
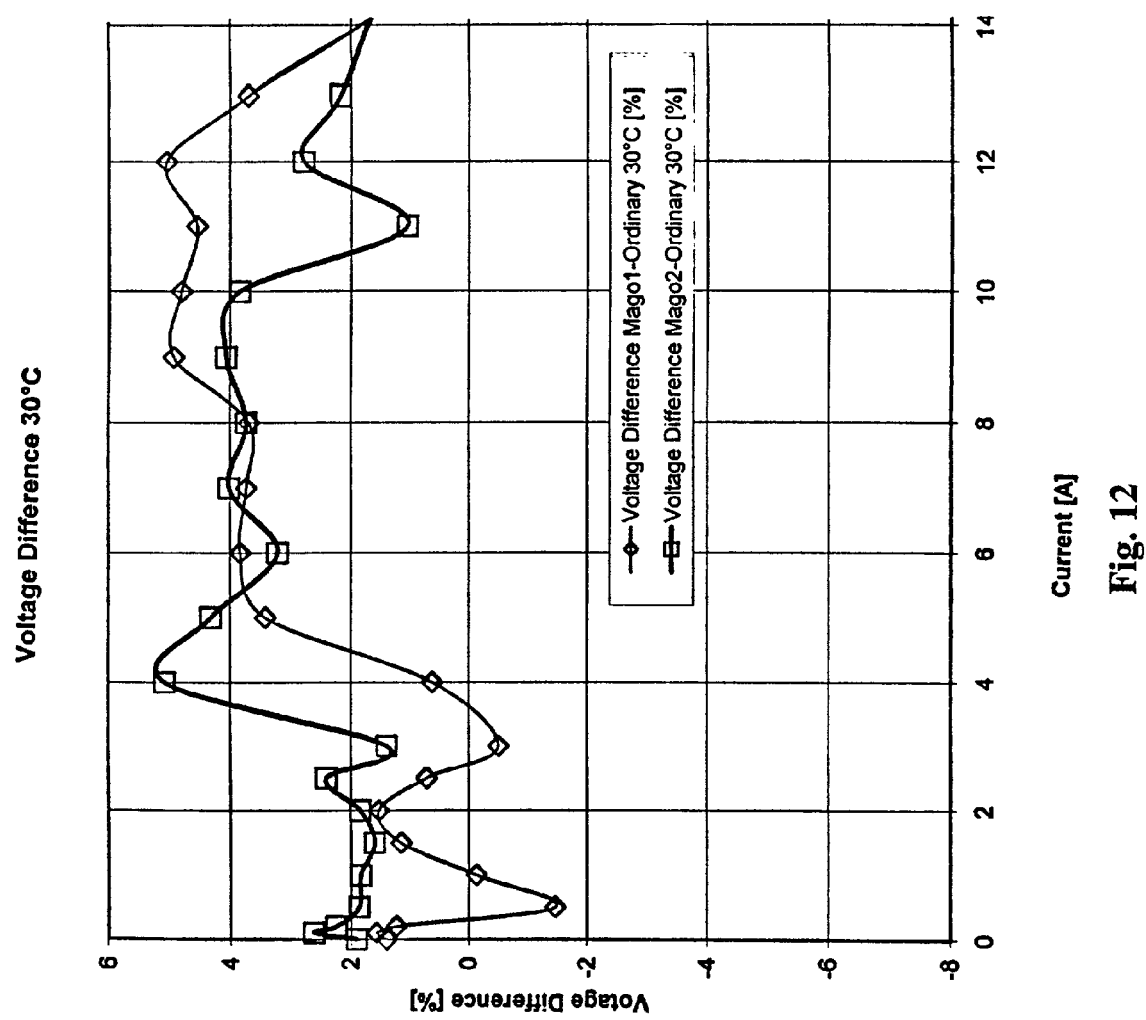
FIG. 12 depicts the voltage increase in a fuel cell via the use of oxygen with magnecular structure.
Figure 13:
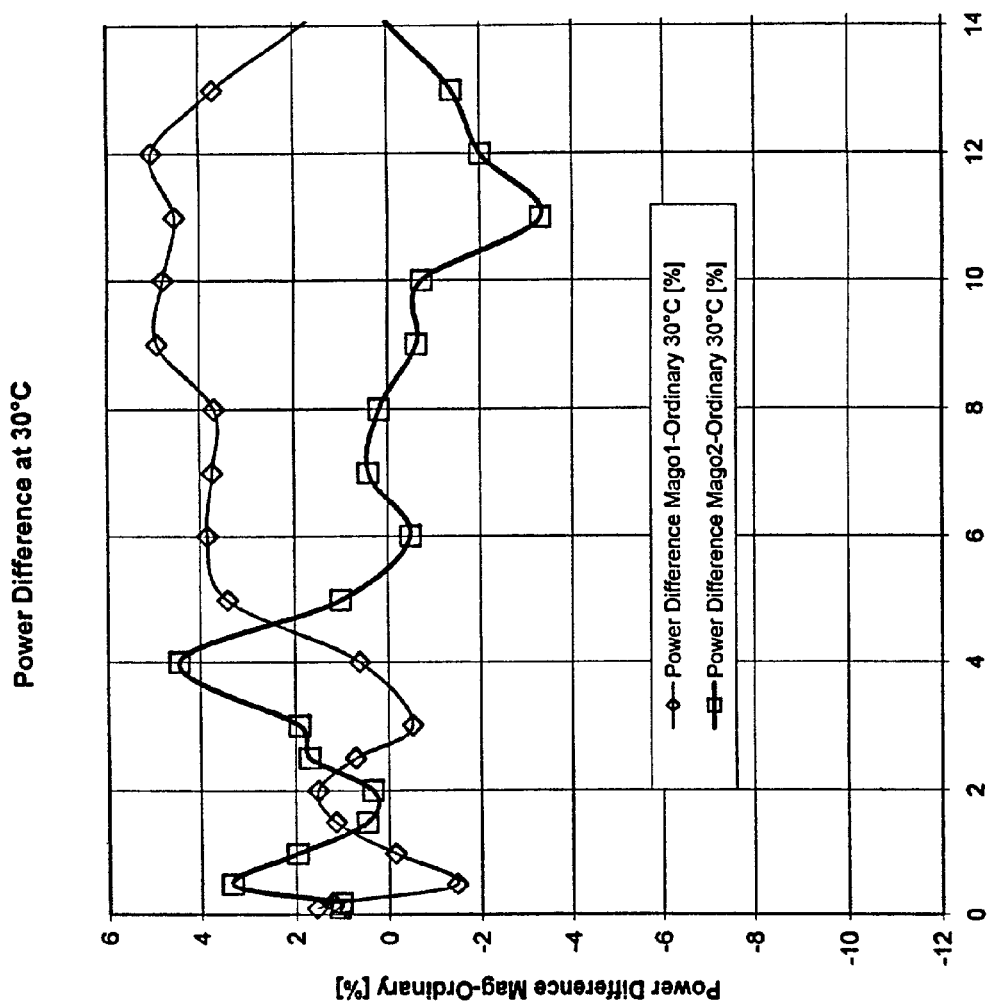
FIG. 13 depicts the power increase in a fuel cell via the use of oxygen with magnecular structure.
Figure 14:
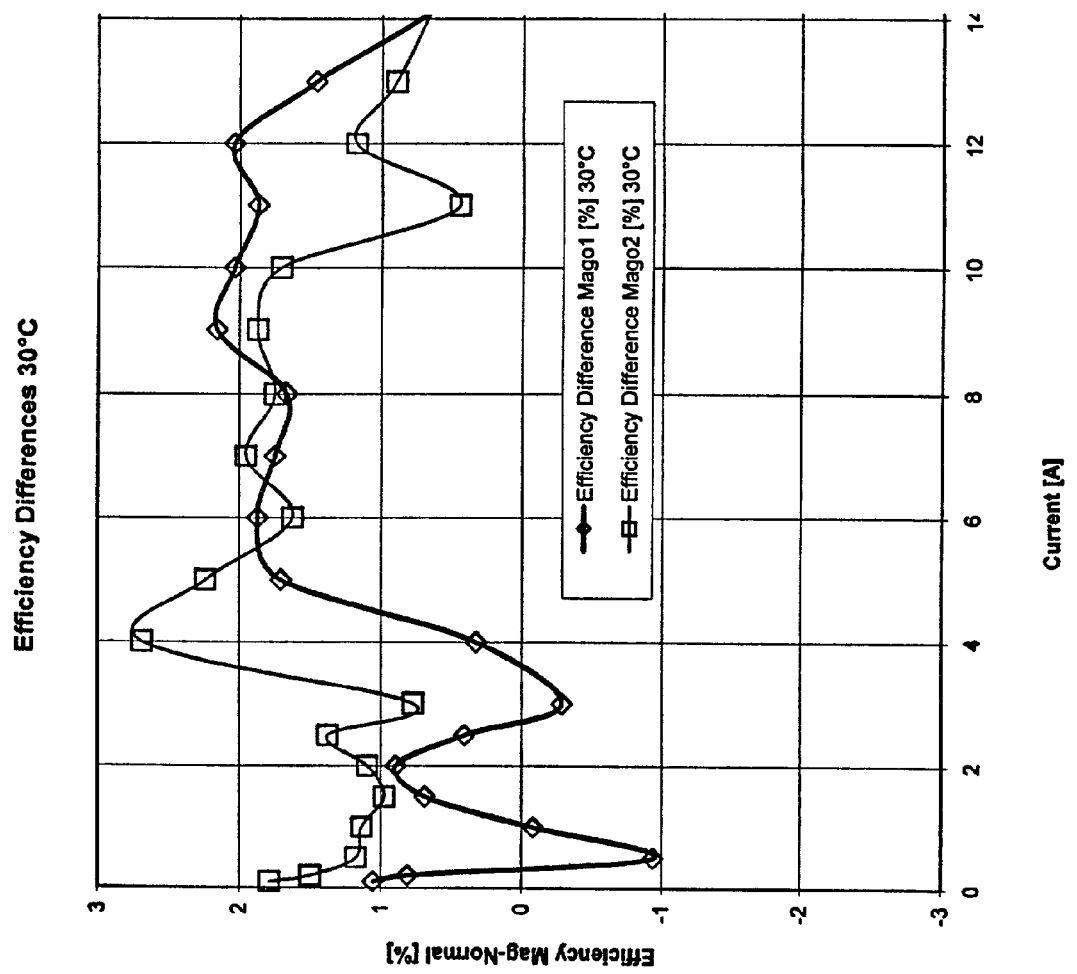
FIG. 14 depicts the efficiency increase in a fuel cell via the use of oxygen with magnecular structure.

The results of the measurements are summarized in FIGS. 12. 13 and 14 which report relative measurements compared to the same conditions of the cell when working with ordinary pure oxygen. As one can see, these measurements show a clear increase of the voltage, power and efficiency of the maximal order of 5% when the cell was operated with the processed oxygen. To appraise these results, one should note that the samples of the processed oxygen used in the test were reached via an equipment operated with an ordinary automotive battery, powering intermitted sparks as typically the case in automotive engines, and with the pressure limited to 15 psi. By comparison, the processed oxygen of this invention should be produced by an array of arcs each operated by 50 Kwh power unit, with continuous discharges at 1,000 A, the apparatus being operated at 4,500 psi. It is evident that the transition from the conditions of the test to those of this invention imply a significant increase of the performance of the fuel cells when operated with the processed oxygen. Moreover, bigger increases in voltage, power and efficiency are expected when a fuel cell is operated with both the processed oxygen and the processed hydrogen.

In summary, the systematic character of the results combined with the limited capabilities of the equipment confirm the capability of this invention of producing new forms of hydrogen and oxygen with magnecular structure with increase in voltage, power and efficiency of fuel cells with can be very conservatively estimated to be of the order of 20%.

Additional tests were conducted with the processed hydrogen produced with the equipment of FIGS. 10 and 11. A clean burning combustible gas was first produced by using ordinary tap water as liquid feedstock. The combustible gas then passed through a 5 Armstrong zeolite filter as described above. The filtered gas, was then subjected to the following three measurements:

1) The average molecular weights of the processed hydrogen was measured by two independent laboratories which issued written statements that this particular form of processed hydrogen has an average molecular weight of 15.06 a.m.u., while conventional pure hydrogen has the molecular weight of 2.016, thus implying a 7.47 fold increase over the molecular weight of conventional hydrogen.

2) This type of processed hydrogen was then subjected to analytic measurements by a qualified laboratory via Gas Chromatography (CG) and Fourier transform infrared spectroscopy (FTIR). All measurements were normalized, air contamination was removed, and the lower detection limits were 0.01%. The results are reported in FIG. 15. As one can see, these measurements indicate that this particular type of processed hydrogen was composed of 99.2% hydrogen and 0.78% methane, while no carbon monoxide was detected.

Figure 16:
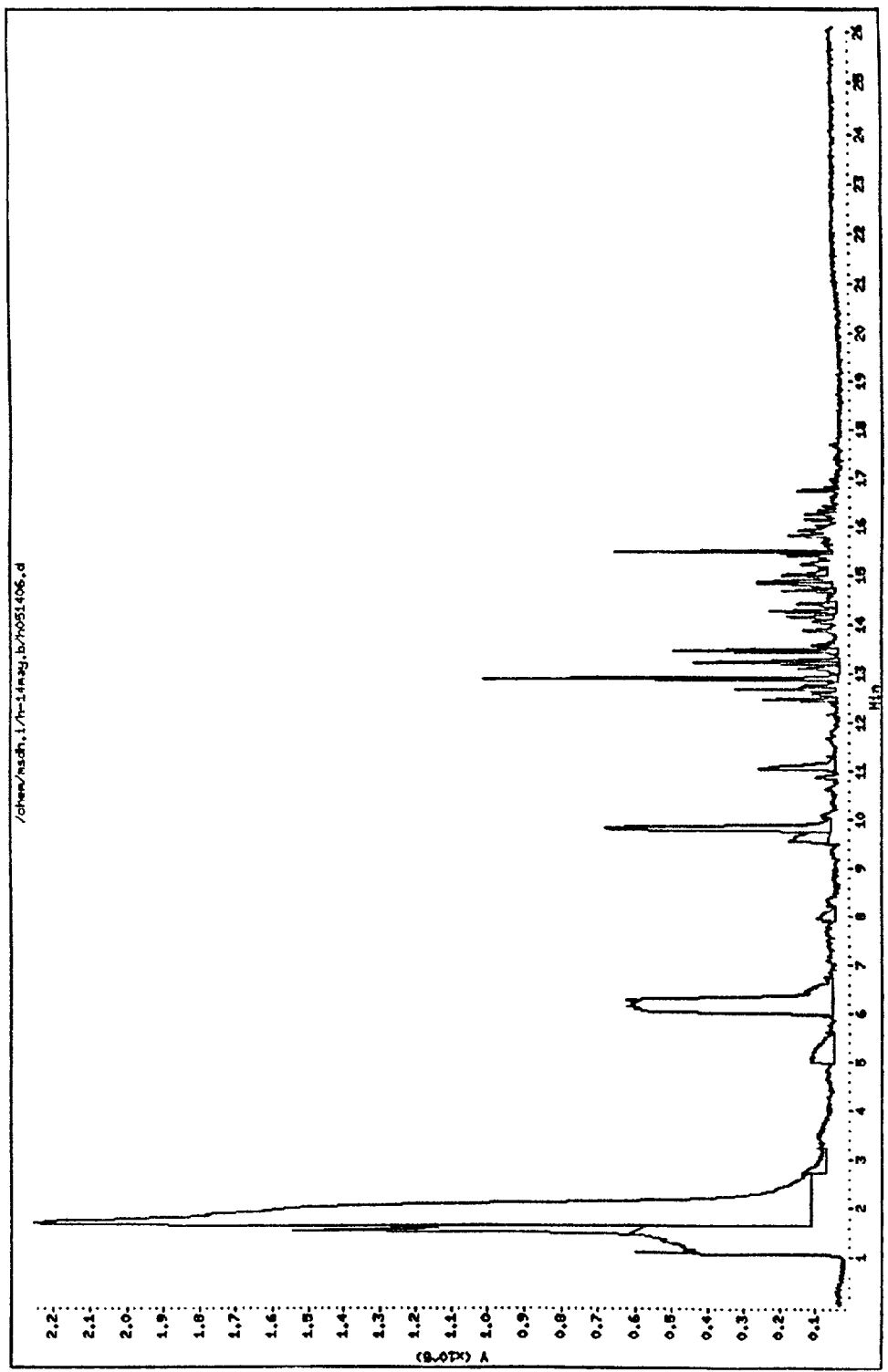
FIG. 16 depicts mass spectrometric measurements of the same gas depicted in FIG. 15.

3) The same type of processed hydrogen used in the preceding tests was submitted to Gas Chromatographic Mass Spectrometric (CG-MS) tests via the use of a HP GC 5890 and a HP MS 5972 with operating conditions specifically set for the detection of the cluster which are different than those for molecules, such as: a feeding line with the biggest possible section of 0.5 mm diameter was selected (to prevent that large magneclusters are not permitted to enter the instrument because of the use of a micrometric feeding line); the feeding line was cryogenic cooled; the operation of the columns at the lowest admitted temperature of 10 degrees C. (to prevent that the column temperature would disintegrate the magnecular clusters); the longest possible ramp time of 26 minutes was selected (to permit the separation of the peaks representing magnecular clusters); and other requirements. The results of this third test are reproduced in FIG. 16. As one can see, by keeping in mind the results of GC-FTIR of FIG. 15, the GC-MS measurements should have shown only two peaks, that for hydrogen and that for methane. On the contrary, these GC-MS tests do confirm indeed the existence of a large peak at about a molecular weight of 2 a.m.u. evidently representing hydrogen, but also the presence of a considerable number of additional peaks in macroscopic percentages all the way to a molecular weight of 18 a.m.u. It is evident that these latter peaks establish the existence of a magnecular structure in the type of magnecular cluster of hydrogen here studied. Note, in particular, the existence of well identified peaks in macroscopic percentage with atomic weight of 3, 4, 5, 6, 7, 8 and higher value which, for the gas under consideration here, can only be explained as magnecules cluster composed of individual H atoms as well as H molecules in increasing numbers.

It is evident that the above measurements 1), 2) and 3) confirm in a final form the capability by this invention to produce hydrogen, oxygen and other gases with a large multiple value of their standard specific density, and consequential increase of their energy content per cubic foot.

What is claimed is:

1. An apparatus for processing gas comprising:
   a pressure resistant piping system equipped with means for closing and opening said piping system;
   means for filling up said piping system with a gas and means for compressing said gas to a desired pressure;
   means for generating a magnetic field within said piping system;
   means for delivering an electric power to said means for generating the magnetic field within said piping system;
   means for recirculating said gas through said means for generating the magnetic field;
   means for restricting the flow of said gas along a slit surrounding said means for generating the magnetic field; and
   means for collecting a resultant processed gas,
   wherein said means for generating the magnetic field is at least one pair of electrodes placed within said piping system and configured to deliver an electric arc within an interior of the piping system.

2. The apparatus according to claim 1, wherein the electric current of said means for generating the magnetic field is continuous.

3. The apparatus according to claim 1, wherein the electric current of said means for generating the magnetic field is alternating.

4. The apparatus according to claim 1, wherein the electric current of said means for generating the magnetic field is pulsing.

5. The apparatus according to claim 1, wherein said gas is hydrogen.

6. The apparatus according to claim 1, wherein said gas is oxygen.

7. The apparatus according to claim 1, wherein said gas is a non-combustible gas.

8. The apparatus according to claim 1, wherein said gas is a gaseous hydrocarbon fuel.

9. The apparatus according to claim 1, wherein said gas is a liquid vapor.

10. A method for processing gas comprising:
    providing a pressure resistant piping system equipped with means for closing and opening said piping system;
    providing means for filling up said piping system with a gas and means for compressing said gas to a desired pressure;
    providing means for generating a magnetic field within said piping system;
    providing means for delivering an electric power to said means for generating the magnetic field;
    providing means for recirculating said gas through said means for generating the magnetic field;
    means for restricicting the flow of said gas along a slit surrounding said means for generating the magnetic field;
    providing means for collecting a resultant processed gas; and
    filling said piping system with the gas, recirculating the gas through the means for generating a magnetic field within said piping system and collecting the resultant processed gas,
    wherein said means for generating the magnetic field is at least one pair of electrodes placed within said piping system and configured to deliver an electric arc within an interior of the piping system.

11. The method according to claim 10, wherein the electric current of said means for generating the magnetic field is continuous.

12. The method according to claim 10, wherein the electric current of said means for generating the magnetic field is alternating.

13. The method according to claim 10, wherein the electric current of said means for generating the magnetic field is pulsing.

14. The method according to claim 10, wherein said gas is hydrogen.

15. The method according to claim 10, wherein said gas is oxygen.

16. The method according to claim 10, wherein said gas is a non-combustible gas.

17. The method according to claim 10, wherein said gas is a gaseous hydrocarbon fuel.

18. The method according to claim 10, wherein said gas is a liquid vapor.

* * * * *